(No Model.)
F. B. VON WECHMAR.
WHEELED VEHICLE.
No. 400,376. Patented Mar. 26, 1889.
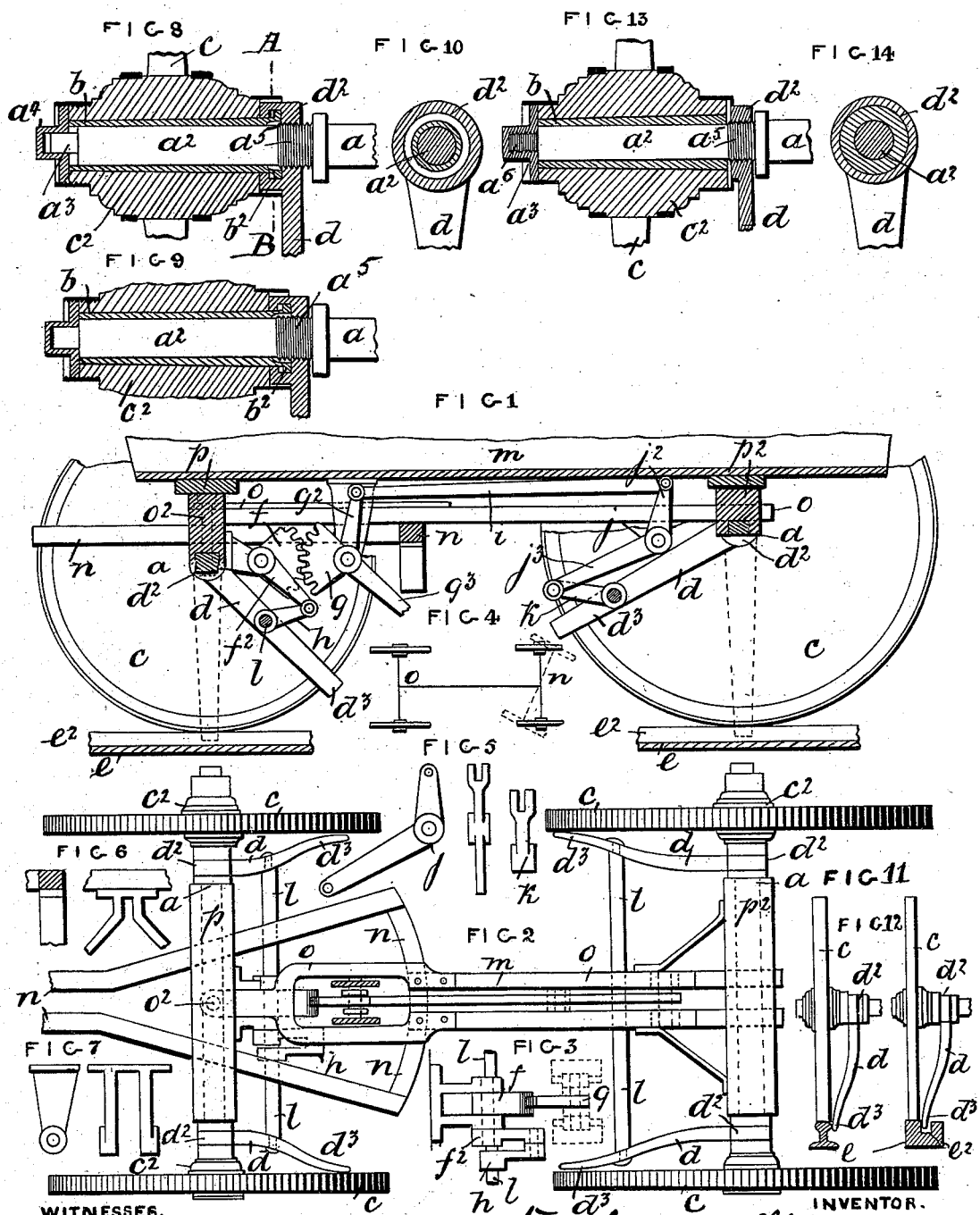
WITNESSES.
INVENTOR.

UNITED STATES PATENT OFFICE.

FRITZ BARON VON WECHMAR, OF HANOVER, GERMANY.

WHEELED VEHICLE.

SPECIFICATION forming part of Letters Patent No. 400,376, dated March 26, 1889.

Application filed April 11, 1888. Serial No. 270,295. (No model.) Patented in Germany April 5, 1887, No. 41,924, and in England September 5, 1887, No. 11,998.

*To all whom it may concern:*

Be it known that I, FRITZ BARON VON WECHMAR, a subject of the Emperor of Germany, residing at Hanover, Germany, have invented certain new and useful Improvements in Mounting and Adjusting the Wheels of Road-Vehicles, and in a guide appliance to be used therewith; and I do hereby declare the following to be a full, clear, and exact description of the invention, reference being had to the accompanying drawings, which form part of this specification.

The principal object of this invention is to enable ordinary vehicles, or vehicles whose wheels are flangeless, to run upon railway and tramway tracks.

The improvements consist, first, in adjusting the said wheels of road-vehicles to varying tracks of rails; secondly, in a device or means for preventing the said wheels from leaving the tracks; thirdly, in mounting wheels or their carrying framings in such a manner that their partial free motion shall be annulled when used on ordinary roads.

Figure 1 represents in vertical section, partly in elevation, the lower part of the body of an ordinary vehicle provided with the parts constructed and arranged according to my invention. Fig. 2 represents a top side view of Fig. 1, with the body of the vehicle removed. Fig. 3 represents in plan the toothed quadrant-bracket part, as best seen in elevation, Fig. 1. Fig. 4 represents a diagrammatic view of the plan of the wheels. Figs. 5, 6, and 7 represent some of the parts separately. Fig. 8 represents in vertical section the axle-arm and hub of the wheel and the means for adjusting the said wheel upon its axle-arm. Fig. 9 represents a like section as Fig. 8, but with the arm of the axle in a different position with respect to its hub. Fig. 10 is a transverse section on the dotted lines A B, Fig. 8. Figs. 11, 12, 13, and 14 are details.

The same letters of reference indicate corresponding parts in the several figures of the drawings.

$a$ is the axle. $a^2$ is the axle-arm, and $a^3$ is its outer plain reduced end, which slides within a plain cap, $a^4$, while the axle-arm $a^2$ slides and works within the axle-box $b$, situated within the middle of the hub $c^2$ of the flangeless wheel $c$.

$d$ is an arm, and $d^2$ is a screw-box at its upper end, which takes upon a like wormed part, $a^5$, on the axle-arm $a^2$ next to the collar, situated between the said arm and axle. The screw-box $d^2$ of the arm $d$ is chambered or made hollow, wherein the inner flanged end, $b^2$, of the axle-box $b$ works, but leaving a little play between the inside parts of the said chambered part and the flange $b^2$. When a vehicle is required to be run upon a track of a determinate gage, then the wheels are adjusted to that gage by first disconnecting the arm $d$ from the other parts, as hereinafter described, and then rotating the said arm until the distance between the wheel is increased or decreased to the determinate distance required, and then fixed by making the arm's connection with the means for the raising of it out of position. The adjustment of each wheel upon its axle-arm is effected by the screwing of the screw-box $d^2$ over the wormed part $a^5$ of the axle-arm, and in consequence of the said screw-box being connected to the axle-box the said rotation causes the box to be traversed to and fro upon the arm.

The arms $d$, which are the track-arms, prevent the wheels of the vehicle from running from off the rails or leaving the tracks, when its end, or its lower end, $d^3$, is placed and runs within the groove $e^2$ of a rail or track, $e$, as in Fig. 11, or upon the side of a rail or track, as in Fig. 12. The simultaneous removal of the arms from the grooves within the tracks or from the sides of the tracks is effected by toothed quadrants $f$ $g$, hung upon brackets depending from or connected with the fore part of the vehicle. The former toothed quadrant, $f$, has an arm, $f^2$, whose lower end has a link, $h$, connected to a coupling-rod, $l$, which connects the two opposite track-arms together. The other toothed quadrant, $g$, has a bell-crank lever, with arms $g^2$ $g^3$, the latter of which constitutes the handle for the simultaneous working of the whole of the track-arms $d$, situated on the two opposite sides of the vehicle, both fore and aft, while the arm $g^2$ is jointedly connected to one end of a connecting-rod, $i$, whose other end is connected to a short arm, $j^2$, of a crank-lever, $j$, whose lower end, $j^3$, is connected by a link, $k$, to the coupling-rod $l$ at the rear of the vehicle, and which coupling-rod connects the two opposite and rear track-arms, $d$, so that after the wheels have been adjusted to the widths of the tracks the track-arms $d$ can be lowered simultaneously into and out of position, as represented in both dotted and full lines, Fig. 1, by depressing or raising the arm $g^3$, which communicates the necessary motion through the intervention of the parts, as aforesaid.

The body $m$ of the carriage is mounted upon front and rear framings, $n$ $o$. The front framing, $n$, which makes a quadrant-bearing for the framing $o$, is connected to the bed or longitudinal block $p$, secured to the front under side of the body $n$. The other or back framing, $o$, which extends underneath the carriage-body, rests upon the quadrant part of the framing $n$, and is attached at its fore part by a swiveling joint or pin, $o^2$, to the front bed, $p$, while its other end is connected to the rear bed or block, $p^2$, upon which the under side of the hind part of the vehicle is secured.

Fig. 13 represents a modification of the means for adjusting the distance between the wheels. The difference between this arrangement and Fig. 1 is that the screw-box $d^2$ at the inner end of the arm $d$ is disconnected from the axle-box $b$, and that the reduced end $a^3$ is wormed, upon which an adjustable cap, $a^6$, is screwed, so that on the adjustment of the wheel the cap $a^6$ is first removed, and then the arm $t$ rotated to the desired extent, after which the cap is then refixed upon the said reduced end, thereby securing the wheel in its desired position with respect to the axle-arm.

Having thus described my invention, I claim as new and desire to secure by Letters Patent—

1. A track-arm, $d$, with its inner end formed into a screw-box, $d^2$, for the taking upon a screwed part of the neck of an axle, for the purpose substantially as described and set forth.

2. Adjusting a wheel upon its axle-arm by means of a screw-box, $d^2$, of an arm, $d$, taking upon a screwed part, $a^5$, of a parallel axle-arm, $a^2$, which slides within an axle-box, $b$, whose inner flanged end is connected with the inner returned or flanged end of the axle-box $d^2$, and which said parts are constructed and arranged in combination with the axle $a$, wheel $c$, and hub $c^2$, as described and set forth.

3. The combination, with the swiveling track-arm $d$, wheel $c$, and track $e$ $e^2$, of the toothed quadrants $f$ $g$, arms $f^2$ $g^2$ $g^3$, link $h$, connecting-rod $i$, and coupling-rod $l$ of the fore part of a vehicle, substantially as described and set forth.

4. The combination, with the hind track-arm, $d$, of a vehicle, of a crank-lever, $j$ $j^2$ $j^3$, link $k$, and coupling-rod $l$, substantially as described and set forth.

In testimony that I claim the foregoing I have hereunto set my hand this 27th day of January, 1888.

FRITZ BARON VON WECHMAR, [L. S.]

Witnesses:
JOHN H. SCHNABEL,
W. G. GERLACH.